A. C. HOECKER.
CONTRACTOR EXPANDER.
APPLICATION FILED MAY 12, 1919.
1,337,652. Patented Apr. 20, 1920.
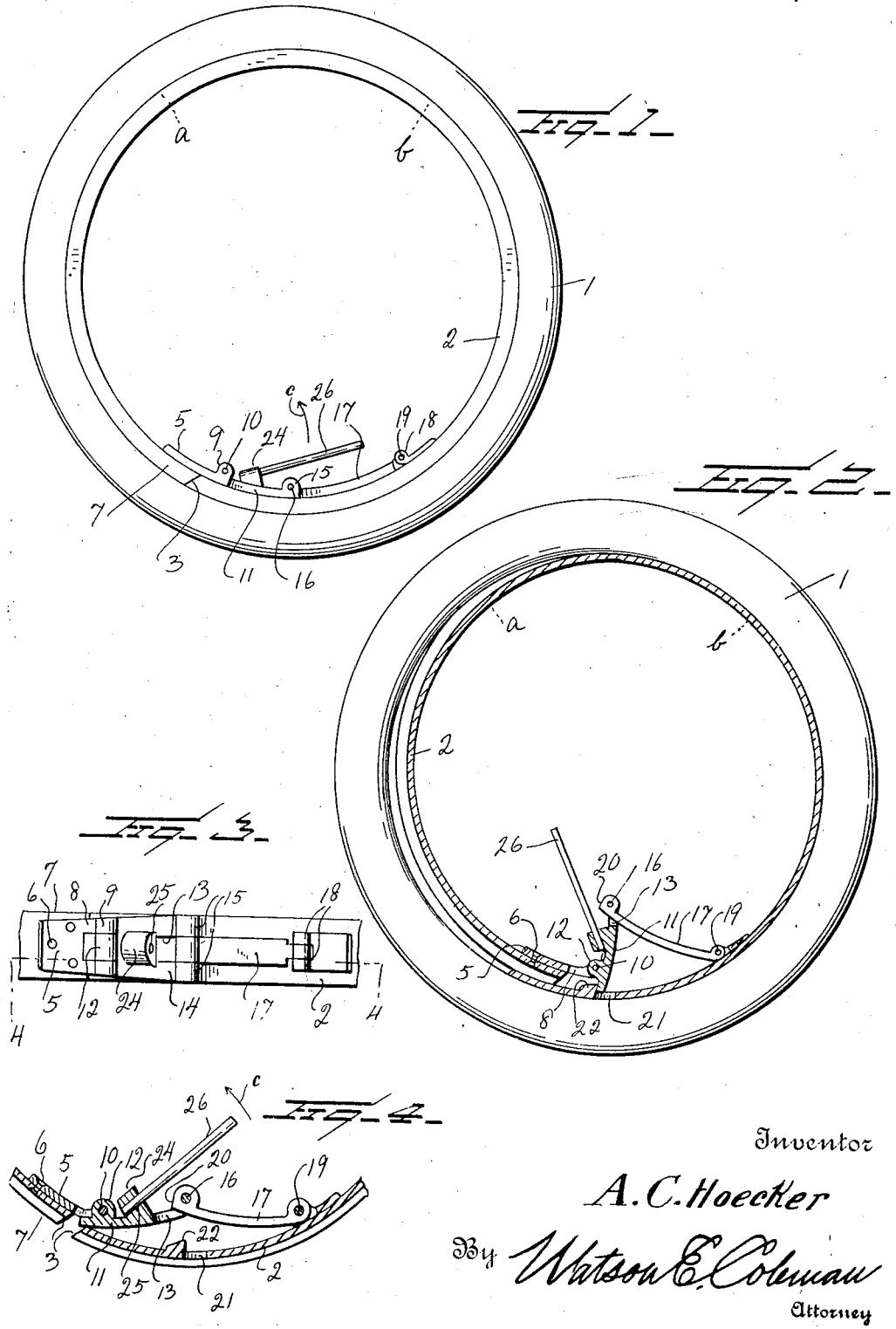

UNITED STATES PATENT OFFICE.

ALBERT C. HOECKER, OF COLLINSVILLE, ILLINOIS.

CONTRACTOR-EXPANDER.

1,337,652.  Specification of Letters Patent.  Patented Apr. 20, 1920.

Application filed May 12, 1919. Serial No. 296,400.

*To all whom it may concern:*

Be it known that I, ALBERT C. HOECKER, a citizen of the United States, residing at Collinsville, in the county of Madison and State of Illinois, have invented certain new and useful Improvements in Contractor-Expanders, of which the following is a specification, reference being had to the accompanying drawings.

This invention relates to an improved contractor-expander, particularly adapted for and permanently mounted on the split ends of a demountable rim, whereby the contractor-expander may be easily and quickly manipulated, to contract the rim, to permit the tire to be easily and quickly removed, for repairs or for permitting a new tire to be placed in position on the rim.

The present invention aims to provide a contractor-expander of this kind involving certain new, efficient and practical features of construction over the device illustrated, set forth and claimed in the patent issued to Albert Hoecker, April 8, 1919, Patent No. 1,299,727.

A further object of the invention is the provision of a contractor-expander, permanently attachable to a demountable split wheel rim, a portion of which at a point diametrically opposite the split portion of the rim being tempered for a requisite distance, whereby the split ends may be contracted from engagement with each other, or expanded into engagement with each other, in order to permit the tire to be removed, or a new one placed in position.

A further object of the invention is the provision of a contractor-expander consisting of a plurality of interconnected links, so hingedly connected together, and certain of which are carried by the end portion of the rim, and so arranged, whereby certain of the links may be collapsed inwardly in a toggle link fashion to contract the rim, in order to demount it from engagement with the tire. Also said inwardly collapsible links may be manipulated in a reverse direction subsequently to collapsing them inwardly, in order to expand or restore them to their normal positions, whereby the rim may be expanded in contact with the tire.

A further object of the invention is the provision of means on one of the inwardly collapsible links, coöperating with one of the ends of the rim, so as to separate the split ends of the rim, whereby upon further movement of the collapsible links, the rim may be contracted.

The invention further aims to provide a contractor-expander, including means on a portion of the rim, to be engaged by the means (which acts to separate the split ends), to hold the links collapsed, when moved inwardly in a toggle link fashion, such holding means being engaged by one end of one of the links when in its normal position, to reinforce the links, thereby in turn reinforcing the rim in its expanded condition.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in side elevation of an automobile split wheel rim, showing the improved contractor-expander as applied thereto and constructed in accordance with the invention.

Fig. 2 is a sectional view through the rim, showing the like connections of the contractor-expander, and showing certain of the links collapsed inwardly, the rim contracted which leaves the tire, which is illustrated, free to be removed, and also showing the holding means to hold the links collapsed inwardly.

Fig. 3 is a plan view of the inner face of the rim and more clearly showing the construction of the contractor-expander.

Fig. 4 is a detail sectional view on line 4—4 of Fig. 3, showing the split ends of the rim just in the act of being separated by the contractor-expander, a tongue on one of the links thereof coöperating with one of the split ends as pressure is applied on a lever in the direction of the arrow *c*, causing the split ends to separate, whereby the rim may be contracted.

Referring to the drawings, 1 designates the usual form tire, which is in position on the rim 2. The rim is split as shown at 3, the split ends are beveled correspondingly.

The rim at a point diametrically opposite the split for a distance between a and b is tempered sufficiently to give the rim spring action, whereby the split ends of the rim may be contracted yieldably inwardly, and when released the spring action will urge or expand them outwardly in their normal positions.

This improved contractor-expander comprises a plurality of interconnecting links and connecting means therefor, which are designed to be permanently carried by the split end portions of the rim.

For instance, the contractor-expander includes a link plate 5 permanently secured as at 6 to the end 7. However, it is obvious that the link plate 5 may be made as an integral part of the rim, thereby eliminating the use of rivets or bolts as shown. This link plate is bifurcated, and the arms 8 caused to be formed by the bifurcation are provided with inwardly radial lugs 9, to receive a pivot pin 10. A second link 11 is pivoted upon said pivot pin 10, and this link 11 is formed with a lug or projection 12, engaging in said bifurcation of the permanently secured link plate, that is when the second link is in its normal position in contact with the rim.

The second link is also bifurcated, as shown at 13, and its arms 14 caused to be formed by the bifurcation 13 are supplied with lugs 15. The pivot pin 16 is journaled in the lugs 15, and pivotally mounted upon the pin 16 is a third link 17, which is permanently pivoted between the lugs 18 (which are carried by one end portion of the rim) on the pin 19. These links 11 and 17 are curved concentrically with the rim, whereby they may fit the inner surface of the rim, when restored to their normal positions. Where the link 17 is pivoted upon the pin 16 a corner shoulder 20 is provided. The end portion of the rim carrying the permanently pivoted link 17 is provided with an opening 21, and adjoining said opening is a lug 22, which engages or projects into the bifurcation 13, so that its shoulder 23 may engage the corner shoulder 20, thereby holding the links concentrically in position with relation to the rim. It will be seen that when the links 11 and 17 are collapsed inwardly, in order to contract the adjacent end portions of the rim, the tongue or projection 12 will engage the shoulder 23, to hold the links collapsed inwardly. The link 11 is provided with a radial projection 24 having a socket 25, which is designed to receive a lever 26, which, by means of pressure thereon in the direction of the arrow a, will move or collapse the links 11 and 17 inwardly, as shown in Fig. 2, and by manipulating the lever properly, the links may be moved, and the rim contracted sufficiently, whereby the tongue or projection 12 may engage the shoulder 23, to hold the links in their inwardly collapsed positions. It will be seen that the end portions of the rim are sufficiently contracted to permit the removal of the rim from engagement with the tire, whereby a new tire may be placed in position. When operating the lever, the tongue or projection 12 will coöperate with one of the end portions of the rim, in order to disengage the adjacent split ends, so that the rim can be contracted.

When it is desired to expand or restore the links to their normal positions, the lever may be detached from the socket and used, in order to pry the projection or tongue 12 from engagement with the shoulder 23, by inserting the lever between the rim and the contracting links. As soon as the tongue or projection 12 has been lifted from engagement with the shoulder 23, the expanding links may be forced to their normal positions, by the manipulation of the lever, when in engagement with the socket, or if desired, the operator may restore them to their normal positions by applying foot pressure on the links, at the point where they are pivotally united. The links are expanded or restored to their normal positions, after a new tire is placed in position on the rim, and after the links are restored to their normal positions, the tire is then ready to be inflated.

The invention having been set forth, what is claimed as new and useful is:

1. In a contractor-expander for split rims, the combination with the split ends of the rim, of a pair of toggle links pivotally united and provided with pivotal connections with the end portions of the rim, one of the links having a projection adjacent its pivotal point with one of the split ends, the other end portion of the rim having a lug to be engaged by said projection when the links are collapsed inwardly, to hold the links in their collapsed positions.

2. In a contractor-expander for split rims, the combination with the split ends of the rim, of a pair of toggle links pivotally united and provided with pivotal connections with the end portions of the rim, one of the links having a projection adjacent its pivotal point with one of the split ends, the other end portion of the rim having a lug to be engaged by said projection when the links are collapsed inwardly, to hold the links in their collapsed positions, one of said links having a projection provided with a socket for the reception of a tool for collapsing the links inwardly.

3. In a contractor-expander for split rims, the combination with the split ends of the rim, of a pair of toggle links pivotally united and provided with pivoted connections with the end portions of the rim, one of the links having a projection adjacent its pivoted point with one of the split ends, the other end portion of the rim having a lug to be engaged by said projection when the links are collapsed inwardly, to hold the links in their collapsed positions, one of said links adjacent its pivotal point with the other link having a shoulder to engage the shoulder of one of the end portions of the rim, to hold the links concentrically in normal position with the rim.

4. In a contractor-expander for split rims, the combination with the split ends of the rim, one of said split ends having a bifurcation, a link pivoted to the arms caused to be formed by said bifurcation, said link having a projection adapted to normally engage said bifurcation when the link is in a concentric position with the rim, and also adapted to coöperate with one of the split ends, when the link is moved inwardly to separate the split ends, a second link permanently pivoted on one of the end portions of the rim and in turn pivotally connected to the first link, whereby the two links may collapse inwardly to contract the rim, the second link having abutment means adjacent its pivot with the first link, a lug on the end portion of the rim carrying the second link to be engaged either by said abutment means of the second link to hold the links in concentric normal positions with the rim, or to be engaged by the projection, to hold the links collapsed inwardly, and means carried by the first link to be engaged by a tool to collapse the links inwardly.

In testimony whereof I hereunto affix my signature in the presence of two witnesses.

ALBERT C. HOECKER.

Witnesses:
 CLARA HOECKER,
 LOUIS SCHILDMEIER.